Patented May 11, 1937

2,079,652

UNITED STATES PATENT OFFICE 2,079,652

MANUFACTURE OF ESTERS FROM OLEFINES

Harold S. Davis and Alfred W. Francis, Woodbury, N. J., assignors to Socony-Vacuum Oil Company, Incorporated, New York, N. Y., a corporation of New York No Drawing. Application March 9, 1934, Serial No. 714,821. Renewed September 27, 1935

10 Claims. (Cl. 260—106)

This invention is directed broadly, to the operation of making esters by the direct reaction of olefines and fatty acids in contact with a catalytic inorganic acid and recovering the reaction product. It is specifically directed to certain combinations in this known process of manufacturing esters, and a novel method of recovering the esters from the reaction mixtures.

The direct esterification of olefines is developed in the prior art by Ellis and Cohen, U. S. Patent No. 1,365,052, who contact gases containing olefines, or more preferably, liquid condensates containing olefines, with a fatty acid such as for instance, acetic acid, in intimate contact with 10% or more of sulfuric acid, and by Frolich and Young, U. S. Patent No. 1,877,291, who practise an improvement upon the above operation. In general terms, these processes contemplate a contacting preferably by a continuous and countercurrent process, of a substantially anhydrous fatty acid such as glacial acetic acid containing 10 to 30 per cent of sulfuric acid, and a condensate containing for instance, a mixture of propane and propylene, or butane and butylene. The temperature of the absorption may be about 50–150° C., and is preferably maintained, say within the range from 75–100° C., and, if it is desired to maintain the hydrocarbon component in the liquid state, as is usually done in order to provide a high concentration of olefine reagent necessary for a reasonable reaction rate, the pressure on the system will be in the range of 100 to 700 pounds per square inch. This reaction results in the formation of a reaction mixture containing the ester, some free acetic acid, and sulfuric acid. In the case of a hydrocarbon reagent, a portion of which is a paraffin hydrocarbon, this paraffin hydrocarbon will pass out of the system and carry with it unreacted olefine. In case the hydrocarbon reagent is a substantially pure olefine, the unreacted portion of that olefine will be present in the reaction mixture.

The major disadvantages of the prior art processes consist in the means of separating the esters from the reaction mixture. If, for instance, the reaction mixture contains about 75% ester, 10% unreacted acetic acid and 15% sulfuric acid, it has been found that the ester cannot be distilled directly at atmospheric pressure without severe losses, usually approximating one-half of the ester and incurred by reversal of the synthesis according to the following reaction:

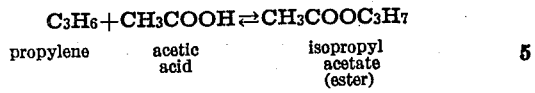

in the presence of sulfuric acid. This failure to recover the ester by distillation occurs in the case of all of the esters which can be made by this method. Ellis and Cohen attempted to avoid this difficulty by dilution of the reaction mixture with water, producing two layers, the upper layer containing most of the acetate (ester) and a relatively small amount of the sulfuric acid so that it can be purified from its acetic acid content by atmospheric distillation. The method is open to the objections (a) that some of the ester is lost by hydrolysis, catalyzed by the dilute sulfuric acid, especially at the higher temperature resulting from heat of dilution; (b) all of the sulfuric acid and acetic acid must be reconcentrated separately nearly to the anhydrous state before these acids can be used again in this process.

Frolich and Young attempted to avoid the difficulty by countercurrent extraction of the reaction mixture without dilution, with an inert low boiling solvent such as pentane. Objections to this method are (a) in presence of acetate (ester), the solvent dissolves substantial amounts of sulfuric acid and acetic acid; (b) the acetate (ester) content of the lower layer cannot be reduced economically below about 30% of the amount originally present by countercurrent extraction; (c) the acetate (ester) content of the lower layer is always much greater than that in the upper (solvent) layer; (d) large volumes of pentane are required and all of it and the ester must be fractionally distilled in order to recover the latter.

It is obvious that a method of recovering the esters from the reaction mixture to be economically successful, should permit the recovery of the ester in quantities substantially as great as the quantities formed, that it should require the use of a minimum of recovery reagent, and that it should leave the unused acetic acid and sulfuric acid in such condition that they may be returned to process without expensive purification and reconcentration.

It has therefore been an object of this invention to devise a process whereby the esters formed by direct esterification of olefines with a mixture of fatty acid and sulfuric acid, can be recovered from the reaction mixture without substantial loss of ester already formed, without objectionable dilution of the unreacted fatty acid and the sulfuric acid to a condition wherein they must undergo extensive reconcentration and purification before being returned to process, and which will accomplish this recovery with a minimum amount of the reagent employed for this purpose. A further object is the development of a continuous process of removal capable of operating with a minimum number of steps and minimum difficulties of control capable of furnishing recovered esters of a high degree of purity, and such other objects and advantages as may hereinafter appear.

It has been found that under certain conditions the ester can be distilled directly from the reaction mixture without appreciable decomposition. This is accomplished by distilling off the ester whilst maintaining the reaction mixture below its boiling temperature in contact with an added olefine gas, and preferably a gas rich in the same olefine used in making the ester. Preferably the gas containing the added olefine is bubbled through the reaction mixture. In the discussion immediately above, the "boiling point" of the reaction mixture has been spoken of. This term is used in this connection to indicate the temperature at which the reaction fixture evolves gases at a substantial rate, and is intended to cover all causes of such evolution of gas resulting from a rise in temperature, regardless of their exact physical or chemical nature. In the case of isopropyl acetate (B. P. 89° C.) for example, the reaction mixture has a boiling temperature of about 100° C., at which it evolves propylene rapidly. But at a lower temperature, 85° C., the partial pressures of the volatile components when in true chemical equilibrium are about as follows, as found by actual experiment:

| | Atmospheres |
|---|---|
| Acetic acid | 0.025 |
| Isopropyl acetate | 0.600 |
| Propylene | 0.375 |
| Total | 1.000 |

Even at this temperature, vacuum distillation causes a substantial, frequently around 40%, loss of ester, but by employing a stream of propylene in a manner somewhat similar to steam distillation, the decomposition can be suppressed completely. Indeed if the synthetic reaction has been stopped somewhat short of actual equilibrium, as would usually be the case in order to save time, there is a slight additional synthesis of ester during the distillation, as has been actually observed.

The amount of olefine required is relatively small. Using the above figures, 0.375 mol. of olefine carry over 0.600 mol. of ester. This means about 3.9 parts by weight of ester carried over by one part of olefine. Actually the amount of ester carried over will be less than this figure because the synthetic reaction will not have been quite completed to equilibrium.

The ester is separated readily from the olefine by condensation, and the olefine can be used again for the same purpose. Since it is not consumed appreciably in this part of the process, it is advantageous to employ substantially pure olefine, whether or not pure olefine is used in the synthetic reaction. Pure olefine can be prepared in several different ways; but one way which is convenient for the operation of this process, is the distillation of a preliminary reaction mixture at its boiling temperature.

The temperature mentioned, 85° C., need not be maintained exactly. At a slightly higher temperature, say 90° C., the rate of decomposition of isopropyl acetate is slow in presence of excess propylene, and there is an advantage in having a distillate richer in ester and requiring less propylene to carry it over. On the other hand, if it is preferred to use a gaseous mixture containing propylene rather than pure propylene, it is preferable to use a lower temperature, say 75° C. or 80° C., so that the partial pressure of propylene is substantially equal to the dissociation pressure. It is emphasized that it is only the olefine involved which is effective in suppressing decomposition. An inert gas such as nitrogen or a paraffin hydrocarbon is not nearly as effective.

In the case of secondary butyl acetate (B. P. 112.2° C.), the product of acetylation of butene-1 or butene-2, the boiling temperature of the reaction mixture is about 120° C., but since the equilibrium is less favorable for the formation of ester than with isopropyl acetate, the preferred temperature for distillation in a current of butenes (either or both butenes) is about 85° C. as before. Relatively more olefine is required to distill the ester, probably because of its lower volatility.

As an example of operation according to this invention, the production of isopropyl acetate is here described. In this case, as raw material, one may use substantially pure propylene or a propylene rich product. As the acid reagent, one employs glacial acetic acid of the technical purity, with which concentrated sulfuric acid has been mixed, to the extent of 20% by weight of the acetic acid. It is preferred to perform the operation of contacting the two reagents (i. e., propylene and the said acid mixture) at a temperature of approximately 100° C. under a pressure of from 500 to 700 pounds, and it is found that after a reaction time of approximately 25 minutes, the conversion of propylene to isopropyl acetate has proceeded to such an extent that upwards of 90-95% of the propylene is converted to ester. It is found that the reaction occurs in proportions fairly close to the theoretical, and that there is no need of supplying any great excess of either reagent. The reaction mixture consisting largely of isopropyl acetate and sulfuric acid, is removed from the contacting chamber as a liquid, and is then subjected to distillation in any convenient form of apparatus. This distillation is carried out at atmospheric pressure, and at a temperature preferably about 85° C., and it is found that the propylene bubbled through the reaction mixture as a stripping agent, is capable of carrying better than three grams of acetate overhead to one gram of propylene. In one experiment this rate was found to be 5.18 grams of acetate to 1.36 grams of propylene, but the carrying power of the propylene is ordinarily not this high, probably due to conditions of incomplete primary reaction. In the case of butyl acetates being carried over by butylene, the proportion of butylene to acetate is ordinarily about 1-1 by weight. By this distillation, the liquid reaction mixture can be reduced to a spent liquor containing approximately 10 to 15 per cent of ester, and approximately 35% of acetic acid, the remainder being sulfuric acid, the mixture being anhydrous so that it can be returned immediately to the reaction tower. The temperature of this distillation may vary widely without damage to the operation. The upper limit is that temperature at which the dissociation velocity of the reaction products becomes sufficiently great that there is a loss of ester, and the lower limit is that temperature at which the distillation becomes uneconomically slow. It may be seen that both of these limits are in reality economic limits, and while 85° C. is preferred as the temperature at which the economics of the problem are most accurately balanced, this preferred temperature may be varied considerably without departing from this invention. Similarly, the range of temperatures under which the original reaction may be carried out are governed by economic considerations of like type. The pressure under which the original reaction may be carried out is that pressure which will maintain the desired condensed or liquid condition of the olefine-containing mixture under the temperature employed, or, any pressure above that pressure. For instance, with propylene, the range of pressure used may be from 300 to 700 pounds per square inch, with butylene, from 100 to 500 pounds per square inch, and similarly lower for olefines of higher boiling point.

The separation of the acetate or other organic acid ester from the removed vapors is rendered a comparatively simple matter by this invention as isopropyl acetate boils at approximately 90° C., at atmospheric pressure, and propylene at that temperature and pressure is a gas, and it has been found that an ordinary water-cooled condenser is sufficient to separate the acetate in a high degree of purity. Similar relationships prevail for the other acetates, and esters of acids other than acetic acid.

We claim:

1. In the method of making an alkyl fatty acid ester by the chemical interaction of an olefine with a fatty acid in intimate contact with a strong non-volatile inorganic acid and separating the ester from the reaction products thus formed, the steps which comprise maintaining said intimate contact until a substantial proportion of the olefine is converted into the corresponding alkyl fatty acid ester and then separating the alkyl ester from the reaction mixture at substantially atmospheric pressure by distillation in contact with an added olefine gas, the temperature and pressure of the reaction mixture during said interaction being sufficiently elevated to produce a substantial rate or speed of said chemical interaction but the temperature being less than that at which substantial reversal of the interaction takes place, and the temperature of the reaction mixture during distillation being sufficiently elevated to produce a substantial rate of evaporation of the alkyl ester from the reaction mixture but less than that at which substantial dissociation of the alkyl ester occurs, and separating the ester from the olefine gas.

2. In the method of making an alkyl fatty acid ester by the chemical interaction of an olefine with a fatty acid in intimate contact with a strong non-volatile inorganic acid and separating the ester from the reaction products thus formed, the steps which comprise maintaining said intimate contact until a substantial proportion of the olefine is converted into the corresponding alkyl fatty acid ester and then separating the alkyl ester from the reaction mixture at substantially atmospheric pressure by distillation in contact with an added olefine gas, the temperature and pressure of the reaction mixture during said interaction being sufficiently elevated to produce a substantial rate or speed of said chemical interaction but the temperature being less than that at which substantial reversal of the interaction takes place, and the temperature of the reaction mixture during distillation being sufficiently elevated to produce a substantial rate of evaporation of the alkyl ester from the reaction mixture but less than that at which substantial dissociation of the alkyl ester occurs, and separating the ester from the olefine gas by cooling the gas-vapor mixture.

3. In the method of making an alkyl fatty acid ester by the chemical interaction of an olefine with a fatty acid in intimate contact with a strong non-volatile inorganic acid and separating the ester from the reaction products thus formed, the steps which comprise maintaining said intimate contact until a substantial proportion of the olefine is converted into the corresponding alkyl fatty acid ester and then separating the alkyl ester from the reaction mixture by distillation in contact with an added gas rich in the same olefine, the temperature and pressure of the reaction mixture during said interaction being sufficiently elevated to produce a substantial rate or speed of said chemical interaction but the temperature being less than that at which substantial reversal of the interaction takes place, and the temperature of the reaction mixture during distillation being sufficiently elevated to produce a substantial rate of evaporation of the alkyl ester from the reaction mixture but less than that at which substantial dissociation of the alkyl ester occurs, and the temperature during distillation being also that temperature at which the partial pressure of the olefine in the gas and the dissociation pressure of the olefine gas evolved from the reaction mixture are substantially equal.

4. In the method of making an alkyl fatty acid ester by the chemical interaction of an olefine with a fatty acid in intimate contact with a strong non-volatile inorganic acid and separating the ester from the reaction products thus formed, the steps which comprise maintaining said intimate contact until a substantial proportion of the olefine is converted into the corresponding alkyl fatty acid ester and then separating the alkyl ester from the reaction mixture by distillation in contact with an added olefine gas, the temperature and pressure of the reaction mixture during said interaction being sufficiently elevated to produce a substantial rate or speed of said chemical interaction but the temperature being less than that at which substantial reversal of the interaction takes place, and the temperature of the reaction mixture during distillation being sufficiently elevated to produce a substantial rate of evaporation of the alkyl ester from the reaction mixture but less than that at which substantial dissociation of the alkyl ester occurs, and contacting the distillation residue with olefine and fatty acid for the production of a further amount of ester.

5. In the method of making an alkyl fatty acid ester by the chemical interaction of an olefine with a fatty acid in intimate contact with a strong non-volatile inorganic acid and separating the ester from the reaction products thus formed, the steps which comprise maintaining said intimate contact until a substantial proportion of the olefine is converted into the corresponding alkyl fatty acid ester and then separating the alkyl ester from the reaction mixture by distillation in contact with an added olefine gas, the temperature and pressure of the reaction mixture during said interaction being sufficiently elevated to produce a substantial rate or speed of said chemical interaction but the temperature being less than that at which substantial reversal of the interaction takes place, and the temperature of the reaction mixture during distillation being sufficiently elevated to produce a substantial rate of evaporation of the alkyl ester from the reaction mixture but less than that at which substantial dissociation of the alkyl ester occurs.

6. In the method of making an alkyl fatty acid ester by the chemical interaction of an olefine with a fatty acid in intimate contact with a strong non-volatile inorganic acid and separating the ester from the reaction products thus formed, the steps which comprise maintaining said intimate contact until a substantial proportion of the olefine is converted into the corresponding alkyl fatty acid ester and then separating the alkyl ester from the reaction mixture by distillation in contact with an added olefine gas consisting predominately of the olefine used in forming the ester, the temperature and pressure of the reaction mixture during said interaction being sufficiently elevated to produce a substantial rate or speed of said chemical interaction but the temperature being less than that at which substantial reversal of the interaction takes place, and the temperature of the reaction mixture during distillation being sufficiently elevated to produce a substantial rate of evaporation of the alkyl ester from the reaction mixture but less than that at which substantial dissociation of the alkyl ester occurs.

7. In the method of making an alkyl fatty acid ester by the chemical interaction of an olefine with a fatty acid in intimate contact with a strong non-volatile inorganic acid and separating the ester from the reaction products thus formed, the steps which comprise maintaining said intimate contact until a substantial proportion of the olefine is converted into the corresponding alkyl fatty acid ester and then separating the alkyl ester from the reaction mixture by distillation in contact with an added olefine gas by bubbling the olefine gas therethrough, the temperature and pressure of the reaction mixture during said interaction being sufficiently elevated to produce a substantial rate or speed of said chemical interaction but the temperature being less than that at which substantial reversal of the interaction takes place, and the temperature of the reaction mixture during distillation being sufficiently elevated to produce a substantial rate of evaporation of the alkyl ester from the reaction mixture but less than that at which substantial dissociation of the alkyl ester occurs.

8. In the method of making an alkyl fatty acid ester by the chemical interaction of an olefine with a fatty acid in intimate contact with a strong non-volatile inorganic acid and separating the ester from the reaction products thus formed, the steps which comprise maintaining said intimate contact until a major proportion of the olefine is converted into the corresponding alkyl fatty acid ester and then separating the alkyl ester from the reaction mixture by distillation in contact with an added olefine gas, the temperature and pressure of the reaction mixture during said interaction being sufficiently elevated to produce a substantial rate or speed of said chemical interaction but the temperature being less than that at which substantial reversal of the interaction takes place, and the temperature of the reaction mixture during distillation being sufficiently elevated to produce a substantial rate of evaporation of the alkyl ester from the reaction mixture but less than that at which substantial dissociation of the alkyl ester occurs.

9. In the method of making an alkyl fatty acid ester by the chemical interaction of an olefine with a fatty acid in intimate contact with a strong non-volatile inorganic acid and separating the ester from the reaction products thus formed, the steps which comprise maintaining said intimate contact for a period of time not less than about twenty five minutes and then separating the alkyl ester from the reaction mixture by distillation in contact with an added olefine gas, the temperature and pressure of the reaction mixture during said interaction being sufficiently elevated to produce a substantial rate or speed of said chemical interaction but the temperature being less than that at which substantial reversal of the interaction takes place, and the temperature of the reaction mixture during distillation being sufficiently elevated to produce a substantial rate of evaporation of the alkyl ester from the reaction mixture but less than that at which substantial dissociation of the alkyl ester occurs.

10. In the method of making an alkyl fatty acid ester by the chemical interaction of an olefine with a fatty acid in intimate contact with a strong non-volatile inorganic acid and separating the ester from the reaction products thus formed, the steps which comprise maintaining said intimate contact until not less than about ninety percent of the olefine is converted into the corresponding alkyl fatty acid ester and then separating the alkyl ester from the reaction mixture by distillation in contact with an added olefine gas, the temperature and pressure of the reaction mixture during said interaction being sufficiently elevated to produce a substantial rate or speed of said chemical interaction but the temperature being less than that at which substantial reversal of the interaction takes place, and the temperature of the reaction mixture during distillation being sufficiently elevated to produce a substantial rate of evaporation of the alkyl ester from the reaction mixture but less than that at which substantial dissociation of the alkyl ester occurs.

HAROLD S. DAVIS.
ALFRED W. FRANCIS.